(12) United States Patent
Pust et al.

(10) Patent No.: US 9,087,530 B2
(45) Date of Patent: Jul. 21, 2015

(54) METHODS OF MANUFACTURING A TRANSDUCER

(75) Inventors: Ladislav R. Pust, Savage, MN (US); Lars H. Ahlen, Bloomington, MN (US); Edwin F. Rejda, Bloomington, MN (US); David C. Seets, Shorewood, MN (US); Lance E. Stover, Eden Prairie, MN (US); Dian Song, Eden Prairie, MN (US); Feng Y. Wang, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 16 days.

(21) Appl. No.: 13/537,382

(22) Filed: Jun. 29, 2012

(65) Prior Publication Data

US 2013/0000107 A1    Jan. 3, 2013

Related U.S. Application Data

(63) Continuation of application No. 11/700,474, filed on Apr. 12, 2007, now abandoned.

(51) Int. Cl.
*G11B 5/127* (2006.01)
*H04R 31/00* (2006.01)
*G11B 5/31* (2006.01)
*G11B 5/40* (2006.01)
*G11B 5/60* (2006.01)

(52) U.S. Cl.
CPC ............ *G11B 5/3133* (2013.01); *G11B 5/1278* (2013.01); *G11B 5/3136* (2013.01); *G11B 5/3169* (2013.01); *G11B 5/40* (2013.01); *G11B 5/6064* (2013.01); *Y10T 29/49032* (2015.01); *Y10T 428/1164* (2015.01)

(58) Field of Classification Search
USPC ............... 29/603.03, 603.07, 603.12–603.16, 29/603.18; 360/97.02, 97.03, 234.1, 360/254.4, 254.8, 255.3, 255.7; 451/5, 41
See application file for complete search history.

(56) References Cited

U.S. PATENT DOCUMENTS

| | | | |
|---|---|---|---|
| 4,893,203 A | 1/1990 | Ezaki et al. | |
| 5,105,529 A | 4/1992 | Yasar et al. | |
| 5,157,569 A | 10/1992 | Kumasaka et al. | |
| 5,659,447 A * | 8/1997 | Gregory et al. | 360/237 |
| 5,668,690 A * | 9/1997 | Harrison | 360/137 |
| 5,729,399 A * | 3/1998 | Albrecht et al. | 360/75 |
| 5,959,801 A | 9/1999 | Gillis et al. | |
| 5,999,368 A | 12/1999 | Katayama | |
| 6,246,538 B1 | 6/2001 | Kasamatsu et al. | |
| 6,317,293 B1 | 11/2001 | Katayama | |
| 6,351,346 B2 | 2/2002 | Iwamoto | |
| 6,433,965 B1 * | 8/2002 | Gopinathan et al. | 360/235.4 |
| 6,483,668 B2 | 11/2002 | Hipwell et al. | |
| 6,493,182 B1 | 12/2002 | Yamanaka et al. | |
| 6,497,021 B2 * | 12/2002 | Lee et al. | 29/90.01 |
| 6,654,206 B2 | 11/2003 | Hipwell et al. | |
| 6,707,631 B1 * | 3/2004 | Haddock | 360/75 |

(Continued)

*Primary Examiner* — Paul D Kim
(74) *Attorney, Agent, or Firm* — HolzerIPLaw, PC

(57) ABSTRACT

A transducer having an external contact surface includes a writer and a contact member. The writer has a portion extendable relative to an adjacent portion of the external contact surface. The contact member surrounds at least a portion of the extendable writer portion and is spaced from the extendable writer portion. The coefficient of thermal expansion of the contact member is approximately equal to the coefficient of thermal expansion of the extendable writer portion.

9 Claims, 6 Drawing Sheets

(56) References Cited

U.S. PATENT DOCUMENTS

| | | | |
|---|---|---|---|
| 6,799,365 | B2 | 10/2004 | Boutaghou |
| 6,927,929 | B2 * | 8/2005 | Gong et al. .................... 360/31 |
| 7,193,805 | B1 * | 3/2007 | Haddock ........................ 360/75 |
| 7,400,473 | B1 | 7/2008 | Krajnovich et al. |
| 7,495,856 | B2 * | 2/2009 | Payne et al. .................... 360/75 |
| 7,542,243 | B2 | 6/2009 | Lou et al. |
| 7,609,488 | B2 | 10/2009 | Bonin et al. |
| 7,619,847 | B2 | 11/2009 | Takahashi |
| 7,633,714 | B2 | 12/2009 | Sasaki et al. |
| 7,649,712 | B2 | 1/2010 | Le et al. |
| 7,701,676 | B2 | 4/2010 | Kubotera et al. |
| 7,729,088 | B2 | 6/2010 | Kurita et al. |
| 7,782,569 | B2 * | 8/2010 | Cheng et al. ............... 360/235.1 |
| 8,004,795 | B2 | 8/2011 | Wallash et al. |
| 2002/0067574 | A1 * | 6/2002 | Gillis et al. ................ 360/235.4 |
| 2004/0257706 | A1 | 12/2004 | Ota et al. |
| 2005/0197047 | A1 * | 9/2005 | Gillis et al. ........................ 451/5 |
| 2005/0213250 | A1 | 9/2005 | Kurita et al. |
| 2006/0039077 | A1 | 2/2006 | Xu et al. |
| 2007/0035877 | A1 | 2/2007 | Maejima et al. |
| 2007/0247739 | A1 | 10/2007 | Iida |
| 2009/0122435 | A1 | 5/2009 | Takahashi |
| 2009/0257143 | A1 | 10/2009 | Hachisuka |

* cited by examiner

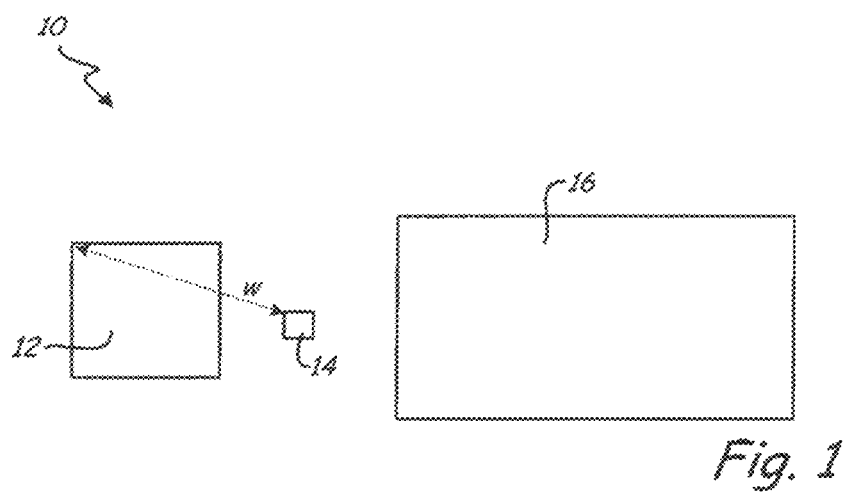

METHODS OF MANUFACTURING A TRANSDUCER

The present application is a continuation of U.S. patent application Ser. No. 11/700,474, now abandoned, entitled "Contact Feature For Use With Transducing Devices" and filed Apr. 12, 2007, which is specifically incorporated by reference herein for all that it discloses or teaches. The present invention relates generally to a magnetic head that includes a contact enhancement feature. In particular, the present invention relates to a magnetic head having a wide head-to-media contact surface.

BACKGROUND OF THE INVENTION

Magnetic data storage and retrieval systems store and retrieve information on magnetic media. A magnetic head is supported relative to a magnetic media surface by a slider. During operation, the disc is rotated by a spindle motor which creates airflow along a storage interface surface (SIS) of the slider from a leading edge to a trailing edge of the slider. Airflow along the SIS of the slider creates a hydrodynamic lifting force so the head of the slider essentially flies above the surface of the magnetic media. The distance between the slider and the magnetic media is known as the fly height.

In a magnetic data storage and retrieval system, a magnetic head typically includes a writer portion for storing magnetically-encoded information on a magnetic media and a reader portion for retrieving the magnetically-encoded information from the magnetic media. To write data to the magnetic media, an electrical current is caused to flow through a conductive write coil to induce a magnetic field in a write pole. By reversing the direction of the current through the write coil, the polarity of the data written to the magnetic media is also reversed.

During operation of the magnetic data storage and retrieval system, the magnetic head is positioned in close proximity to the magnetic media. The distance between the magnetic head and the media is preferably small enough to allow for writing to and reading from the magnetic media with a large areal density, and great enough to prevent contact between the magnetic media and the magnetic head. Performance of the magnetic head depends primarily upon head-media spacing (HMS). High density recording preferably requires a small HMS and a low fly height. Prior to using each magnetic head, there are small variations in fly height that must be accounted for due to changing operating conditions and head-to-head variations.

As the need for data storage increases, the areal bit density of magnetic media also increases. In order to utilize the increased areal bit density of high density magnetic discs, it is necessary to reduce the fly height between the slider and the magnetic media surface. However, as fly height decreases, there is an increased possibility of unintentional contact between the magnetic head and the magnetic media. Extensive contact between the head and the magnetic media can damage the head and lead to loss of data. Thus, the fly clearance must be measured for each magnetic head by a controlled measurable non-destructive head-media contact so that the proper algorithm for operating the heater is used for each magnetic head.

In operation, the layers of the head, which include both metallic and insulating layers, all have different mechanical and chemical properties than the substrate. The differences in properties affect several aspects of the head, including pole tip protrusion of the metallic layers of the head with respect to the substrate at the SIS of the head. Two components of the pole tip protrusion effect exist, thermal pole tip protrusion and current-induced pole tip protrusion. Thermal pole tip protrusion arises from isothermal (global) temperature changes in the head during drive operation. Current-induced pole tip protrusion results from localized heating during application of currents to the write coil and the resultant heat dissipation into the surrounding components of the head. The pole tip protrusion must be accounted for when determining the proper fly height between the slider and the surface of the magnetic media.

The head-media contact is typically detected by a signal that changes sharply when the head mechanically contacts a lube layer of the magnetic media. For example, the signal could be ^PES (position error signal). In the ^PES method of detecting contact, when a head at skew contacts a lubricant layer on the media, it is dragged off-track more than when only flying. To compensate for this off-track drag force, a larger ^PES is generated by a positioning system to keep the head on track. Another method of detecting contact between the head and the magnetic media is acoustic emission (AE) detection. AE detection utilizes the ultrasound made when a head and magnetic media come into contact. To use ^PES or AE, the surface area of the head-media contact must be large enough so that when the thermally protruded magnetic head hits the lube layer of the magnetic media, the magnetic head component protruding most at the storage interface surface does not penetrate past the lube layer and start burnishing on the hard media surface, destroying the protective magnetic head layer.

Fly height control is particularly problematic in high-density magnetic data storage and retrieval systems that use perpendicular writers. In perpendicular writer designs, the return poles are positioned further away from the primary write pole when compared to longitudinal writer designs. During thermally induced contact, only a small region close to the primary write pole comes into contact with the magnetic media. Consequently, the contact area is much smaller for perpendicular writer designs. Both ^PES and AE depend on signals that are proportional to the surface area of the contact between the head and the magnetic media. Thus, the heads of perpendicular writers result in a smaller signal for use in contact detection by AE or ^PES. Additional factors, such as the speed at which the magnetic media revolves, the storage interface surface topology, and air bearing pressurization, can also reduce the contact signal.

Although the feature of the magnetic head that contacts the disc must have a large surface area to control clearance, due to process variations, the primary write pole does not always end up as the closest point to the disc for all magnetic heads. This is needed to minimize the HMS between the writer and the disc. Due to variations in the relative alignment between the primary write pole and the contact point, a significant percentage of magnetic heads have a recessed write pole, causing increased HMS of the primary write pole. Therefore, there is a need for both enhanced contact detection between the magnetic head and disc of a magnetic data storage and retrieval system and for improved alignment between the write pole and the large head-media contact surface.

BRIEF SUMMARY OF THE INVENTION

In one aspect, the invention is a transducer having an external contact surface and includes a writer and a contact member. The writer has a portion extendable beyond the external contact surface. The contact member surrounds at least a portion of the extendable writer portion.

In another aspect, the invention is a transducing device having a storage interface surface and includes a writer, a write coil, and a contact enhancement feature. The writer has a pole tip region proximate the storage interface surface. The write coil is positioned around the pole tip region and has a plurality of write coil layers. The contact enhancement feature is proximate to and aligned with the pole tip region.

In another aspect, the invention is a transducer having a storage interface surface and includes a plurality of thin film layers and a contact enhancement feature. The contact enhancement feature is adjacent at least one of the plurality of thin film layers.

BRIEF DESCRIPTION OF THE DRAWINGS

FIG. 1 is a top view of a representative magnetic head having a contact enhancement feature.

DETAILED DESCRIPTION

Figure 2A:
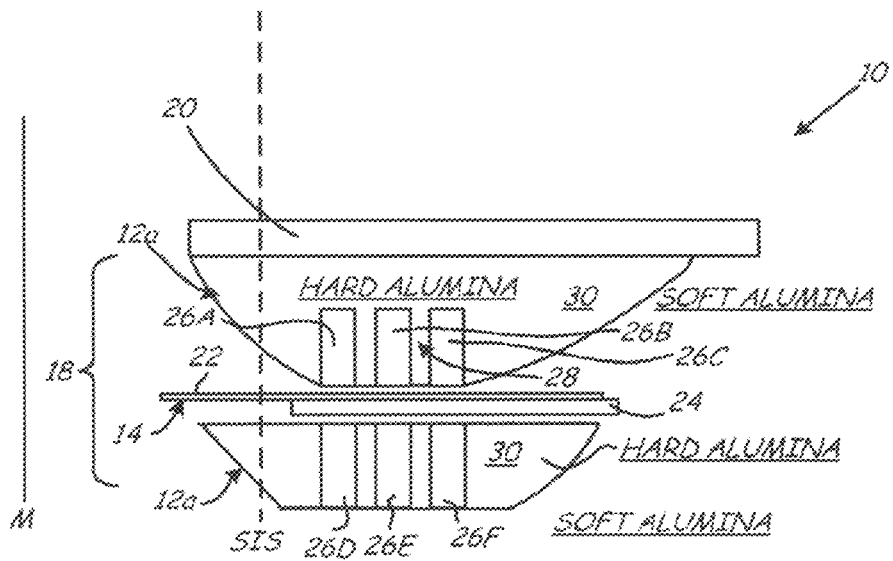
FIG. 2A is a sectional view of a first embodiment of a magnetic head having a contact enhancement feature prior to lapping.

FIG. 1 is a top view of magnetic head 10 having contact enhancement feature 12, write pole tip 14, and substrate 16. Contact enhancement feature 12 serves to increase the head-media contact area of write pole tip 14 and is thus positioned proximate write pole tip 14. The head-media contact is the first contact point between magnetic head 10 and media M (shown in FIGS. 2A-4B). Contact enhancement feature 12 creates a head-media contact surface that is wide enough to detect contact between magnetic head 10 and media M before write pole tip 14 penetrates the lube layer of media M and write pole tip 14 or another component is destroyed. As the head-media contact surface increases in width W, the chances of write pole tip 14 dipping past the lube layer onto the hard media surface of media M and burnishing write pole tip 14 decreases.

To adequately protect write pole tip 14, contact enhancement feature 12 has a much larger surface area than write pole tip 14. The surface area of contact enhancement feature 12 is sized such that ^PES or AE contact detection methods can be effectively used. Because contact enhancement feature 12 has a much larger surface area than write pole tip 14, a signal generated by contact between contact enhancement feature 12 and media M will be much larger than a signal generated by contact between write pole tip 14 and media M. Thus, the fly height of magnetic head 10 can be adjusted before any damage to write pole tip 14. In one embodiment, contact enhancement feature 12 has a surface area of about 20 $\mu m^2$.

In operation, contact enhancement feature 12 has a height substantially equal to the height of write pole tip 14 and is used to indicate when write pole tip 14 is in danger of contacting media M. Because contact enhancement feature 12 and write pole tip 14 have substantially the same height, when contact enhancement feature 12 contacts media M, write pole tip 14 is also in close proximity to media M, indicating that the fly height of magnetic head 10 should be adjusted to avoid burnishing write pole tip 14. Therefore, it is important that write pole tip 14 and contact enhancement feature 12 are positioned in close proximity to one another and have essentially the same height. In one embodiment, contact enhancement feature 12 is positioned about 10 microns ($\mu m$) from write pole tip 14 and the difference in height between write pole tip 14 and contact enhancement feature 12 is less than 1 nanometer (nm).

Contact enhancement feature 12 can be formed by a variety of designs, depending on acceptable trade-offs between the complexity of the manufacturing process and the robustness of the design. Currently, contact enhancement feature 12 is formed by building additional larger metallic components at the storage interface surface (SIS) near write pole tip 14 or by using other functioning components of magnetic head 10. For example, magnetic front shields or return poles can be used as contact enhancement feature 12. However, certain writer designs do not include a front shield or a return pole, in which case a non-magnetic contact enhancement feature is more desirable so that the contact enhancement feature structure does not interfere with the magnetic operations of the magnetic head. Alternatively, contact enhancement feature 12 has also been built specifically to provide the needed wide and flat head-media contact surface. The general principle of the contact enhancement feature is that in operation, heat will cause write pole tip 14 to expand in the fly height direction. Thus, regardless of how contact enhancement feature 12 is formed, contact enhancement feature 12 is typically built from a material having a coefficient of thermal expansion similar to write pole tip 14 so that it will expand at the same rate as write pole tip 14 and be able to indicate when the fly height of magnetic head 10 needs to be adjusted, protecting write pole tip 14 from coming into contact with media M.

Figure 2B:
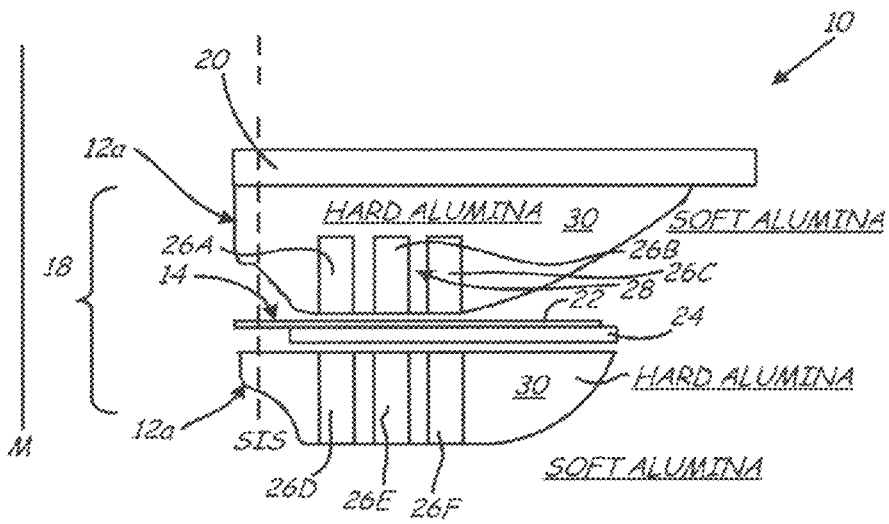
FIG. 2B is a sectional view of the first embodiment of a magnetic head having a contact enhancement feature after lapping.

FIGS. 2A and 2B are sectional views of a first embodiment of magnetic head 10 having contact enhancement feature 12A and writer 18 prior to lapping and after lapping, respectively. Writer 18 generally includes return pole 20, write pole 22, write pole tip 14 located at an end of write pole 22 at the SIS, yoke 24, write coil 26 (shown as write coil turns 26A, 26B, 26C, 26D, 26E, and 26F), and insulator 28. Although magnetic head 10 is shown having one return pole 20, writer 18 may have two return poles or no return pole without departing from the intended scope of the invention.

Return pole 20 and write pole 22 extend from the SIS and are connected to each other distal from the SIS. Yoke 24 is formed on write pole 22 but does not extend the full length of write pole 22. Insulator 28 separates return pole 20, write pole 22, and write coil 26 from each other. Return pole 20 and yoke 24 are formed from metallic ferromagnetic materials. Preferably, each of these components is formed from an alloy composed primarily of Fe, Ni, and/or Co which typically has a large CTE.

As shown in FIGS. 2A and 2B, write coil 26 has coil turns 26A, 26B, 26C, 26D, 26E, 26F. Write coil turns 26A, 26B, 26C, 26D, 26E, 26F wrap around write pole 22 such that the flow of electrical current through conductive write coil 26 generates a magnetic flux at write pole tip 14. In one configuration, coil 26 may be wrapped in the following order: 26A to 26D to 26B to 26E to 26C to 26F. Although FIGS. 2A and 2B show coil 26 to be wrapped in a helical configuration, other configurations can be used without departing from the scope of the intended invention. Each individual coil turn 26A, 26B, 26C, 26D, 26E, 26F is separated from one another and from return pole 20 and write pole 22 by insulator 28. Write coil 26 is generally formed from an electrically-conductive metal, such as Cu, Au, or Ag. Most commonly used is Cu, which has a CTE in the range of about $16.0 \times 10^{-6}/°C$ to $18.0 \times 10^{-6}/°C$.

Insulator 28 surrounds write coil 26 and is preferably formed from a dielectric material with high thermal conductivity to facilitate the removal of heat from write coil 26 via return pole 20 and write pole 22. Insulator 28 is preferably formed from $Al_2O_3$ or a photoresist having a large CTE.

In the first embodiment of contact enhancement feature 12A shown in FIGS. 2A and 2B, contact enhancement feature 12A is formed from aluminum oxide (alumina) deposited on top of write pole 22. During manufacturing of magnetic head 10, magnetic head is formed in an argon-filled environment. However, because alumina is adversely affected by argon, when alumina is deposited in the manufacturing of magnetic head 10, the level of argon is decreased. Due to the decrease in argon during the deposition of alumina, when the alumina is initially deposited on the walls of a tall feature at the wafer level, it forms a mass of hard alumina 30 proximate write coil 26. In certain applications, this mass has the same height relative to the SIS as the write pole 22. The mass of hard alumina 30 formed above write coil 26 shown in FIG. 2A can then be etched into contact enhancement feature 12A. Thus, by controlling the argon content during alumina deposition and controlling the lapping, etching, and cleaning processes used in making magnetic head 10, contact enhancement feature 12A shown in FIG. 2B is obtained from protruded alumina above write coil 26.

Protrusion of write pole 22 may also be controlled by positioning a material, other than alumina, that is difficult to mill or lap during SIS planarization close to write pole 22. The material functions to ensure that write pole 22 is not over-recessed by protecting write pole 22 from lapping and/or milling below the level of surrounding write head features. The material can include, but is not limited to: SiC, Ta, Cr, or any other material that is difficult to mill or lap.

Figure 3A:
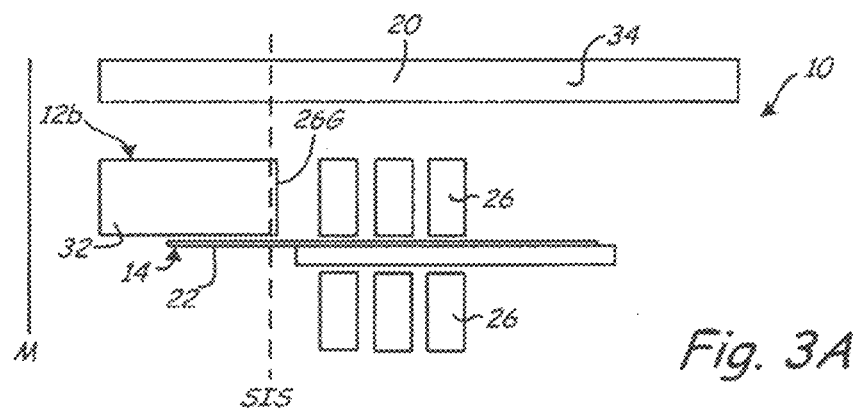
FIG. 3A is a sectional view of a second embodiment of the contact enhancement feature of the magnetic head prior to lapping.
Figure 3B:
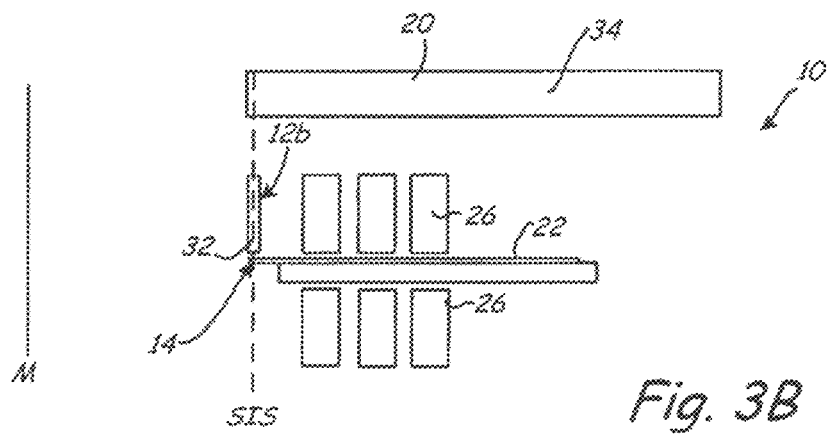
FIG. 3B is a sectional view of the second embodiment of the contact enhancement feature of the magnetic head after lapping.

FIGS. 3A and 3B show a second embodiment of contact enhancement feature 12B prior to lapping and after lapping, respectively. As previously noted, it is important to minimize the difference in height between write pole tip 14 and contact enhancement feature 12B. Because alumina tends to lap and etch differently from metal, which write pole 22 is formed from, it may be desirable to make contact enhancement feature 12B out of metal. In the second embodiment, contact enhancement feature 12B is created from write coil front shield 32, which is a detached write coil turn 26G that does not carry any electrical current. Creating contact enhancement feature 12B from write coil front shield 32 is desirable because it may be implemented by changing only one of the masks used in making magnetic head 10. During manufacture and prior to lapping, write pole 22 and write coil 26 are created in excess of the SIS, with the SIS line showing the location of the desired SIS, as shown in FIG. 3A. Write coil front shield 32 is formed during the lapping process of manufacturing magnetic head 10 when the excess structures of write pole 22 and write coil 26 left of the SIS line are removed, leaving a thin layer of metal from write coil front shield 32 at the SIS, as shown in FIG. 3B. Write coil front shield 32 serves to increase the head-media contact surface of magnetic head 10 and indicate when the fly height of magnetic head 10 relative to media M needs to be adjusted to prevent damage to write pole 22.

Contact enhancement feature 12B of the second embodiment can be made of the same material as write coil 26, such as copper. However, using copper at the SIS presents the risk of corrosion or undesirable topography, which may make copper unsuitable for some applications. If copper is not a suitable choice for contact enhancement feature 12B, then silver, which has a higher resistance to corrosion, may be used. Silver is also a suitable candidate for use in forming write coil 26 because it can be readily plated and has very low electrical resistance. In addition, a designer willing to use additional photolithographic steps can also form contact enhancement feature 12B from NiCu.

As shown in FIGS. 3A and 3B, if contact enhancement feature 12B formed from write coil front shield 32 does not have a sufficient surface area to create a head-media contact area wide enough to protect write pole 22, supplementary contact enhancement feature 34 can be formed on top of write coil 26 by plating another layer of metal. An example of a material used to form supplementary contact enhancement feature 34 includes but is not limited to, Cr. In one embodiment, supplementary contact enhancement feature 34 may also be return pole 20.

Figure 4A:
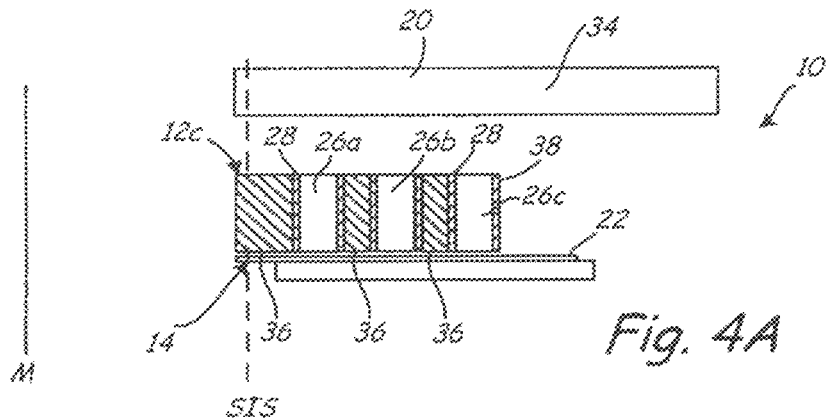
FIG. 4A is a sectional view of a third embodiment of the contact enhancement feature of the magnetic head prior to lapping.
Figure 4B:
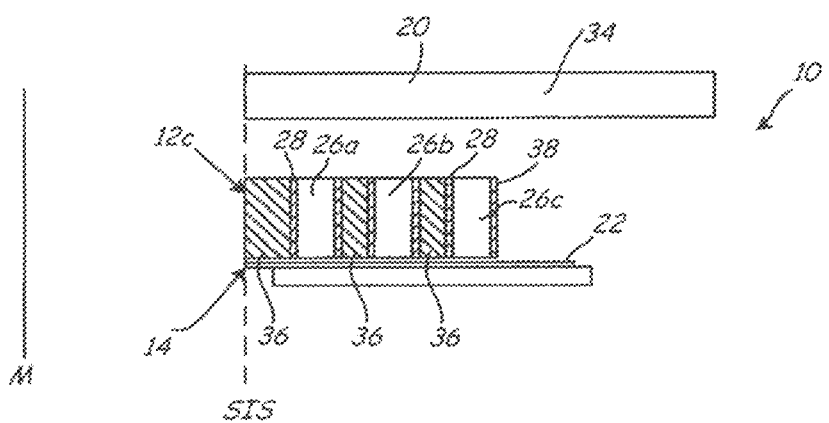
FIG. 4B is a sectional view of the third embodiment of the contact enhancement feature of the magnetic head after lapping.

FIGS. 4A and 4B show a third embodiment of contact enhancement feature 12C prior to lapping and after lapping, respectively. In the third embodiment of magnetic head 10, write coil refill 36 is used to form contact enhancement feature 12C. As in the second embodiment of magnetic head 10 discussed in FIGS. 3A and 3B, when magnetic head 10 is being manufactured, write pole 22 and write coil 26 are created in excess at the SIS, with the SIS line showing the location of the desired SIS (FIG. 4A). The area between write coil turns 26A-26C of write coil 26 is filled with write coil refill 36. Write coil refill 36 serves as a means to reduce the height difference between write pole tip 14 and contact enhancement feature 12C. Write coil refill 36 is formed from a material that is lapped and etched at a rate substantially similar to the lap and etch rate of write pole 22 and may include, but is not limited to: SiC, W, and SiN. However, although SiC, W, and SiN are each good conductors, they are poor insulators, so a layer of insulator 28 is still needed between write coil turns 26A-26C. A thin layer of atomic layer deposition alumina 28 is thus added between write coil turns 26A-26C and write coil refill 36 to separate write coil refill 36 from write coil 26. Contact enhancement feature 12C is formed during lapping when the excess structures of write pole 22 and write coil 26 left of the SIS are removed, leaving a layer of material at the SIS as shown in FIG. 4B.

Figure 5A:
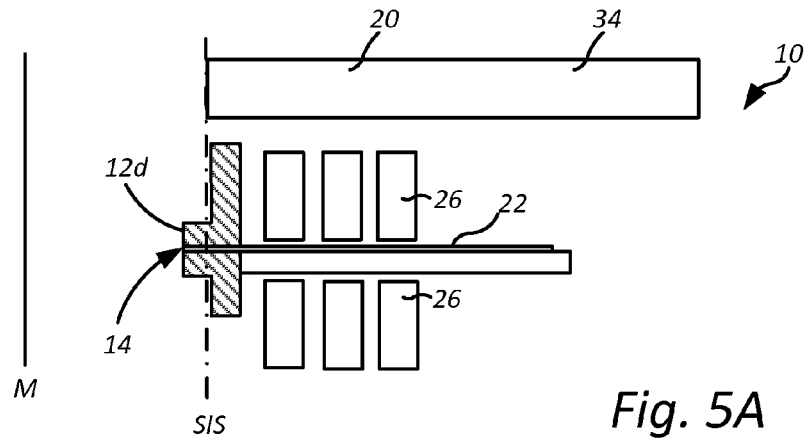
FIG. 5A is a sectional view of a fourth embodiment of the contact enhancement feature of the magnetic head prior to lapping.
Figure 5B:
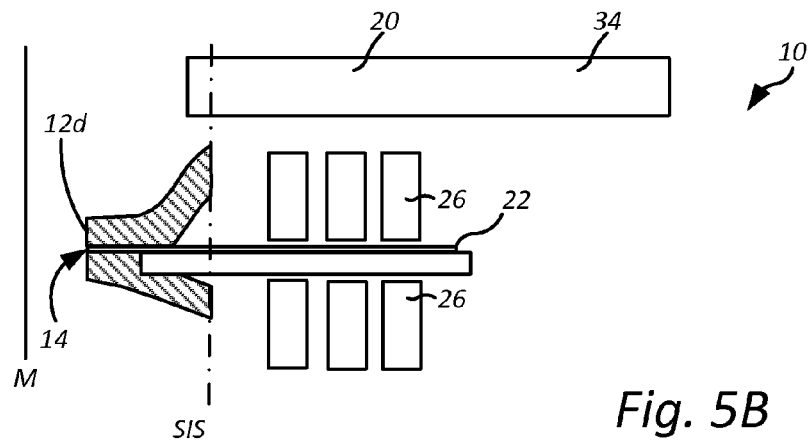
FIG. 5B is a sectional view of the fourth embodiment of the contact enhancement feature of the magnetic head during lapping.
Figure 5C:
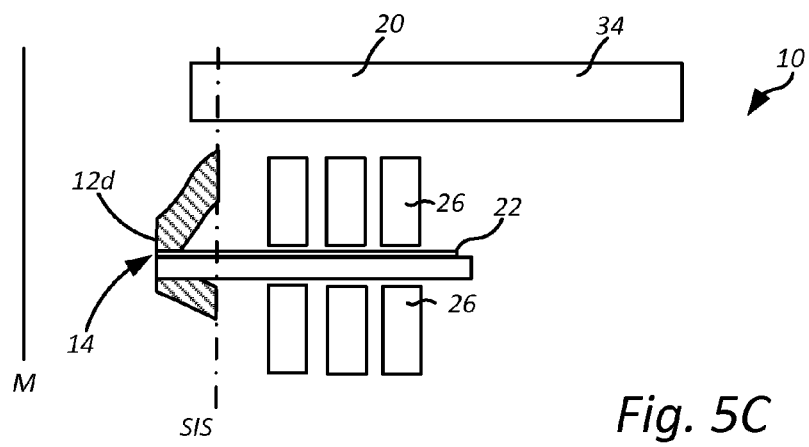
FIG. 5C is a sectional view of the fourth embodiment of the contact enhancement feature of the magnetic head after lapping.

FIGS. 5A, 5B, and 5C show a fourth embodiment of contact enhancement feature 12D prior to lapping, during lapping, and after lapping, respectively. Contact enhancement feature 12D is formed around write pole tip 14 such that write pole tip 14 is covered at the SIS by contact enhancement feature 12D. Magnetic head 10 is then heated such that write pole tip 14 and other elements surrounding write pole tip 14 are thermally protruded at the SIS. By heating the area around write pole tip 14 prior to lapping, it is more likely that write pole tip 14 is proximate the SIS to form at least a portion of the head-media contact surface. Contact enhancement feature 12D and write pole tip 14 are then lapped and burnished until the surfaces of write pole tip 14 and contact enhancement feature 12D are substantially planar and the resulting surface area is such that ^PES or AE contact detection methods can be effectively used to detect contact between contact enhancement feature 12D and media M. In one embodiment, contact enhancement feature 12D is formed of Diamond-Like-Carbon (DLC).

Figure 6A:
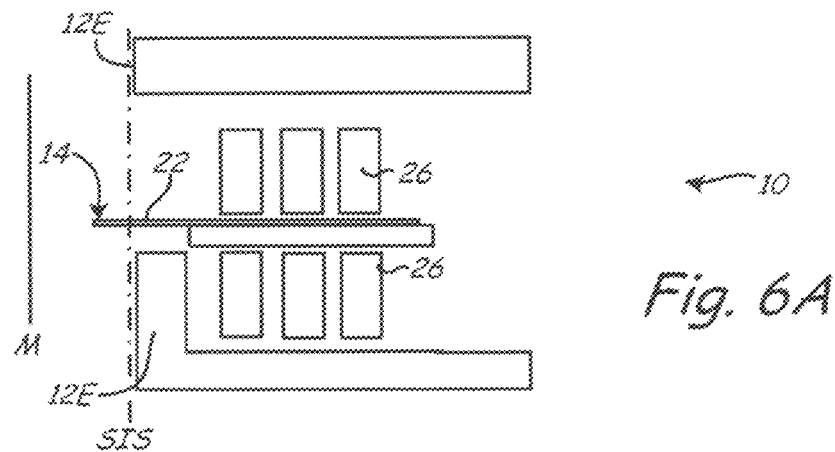
FIG. 6A is a sectional view of a write pole of a magnetic head after lapping but prior to a first controlled head-media contact.
Figure 6B:
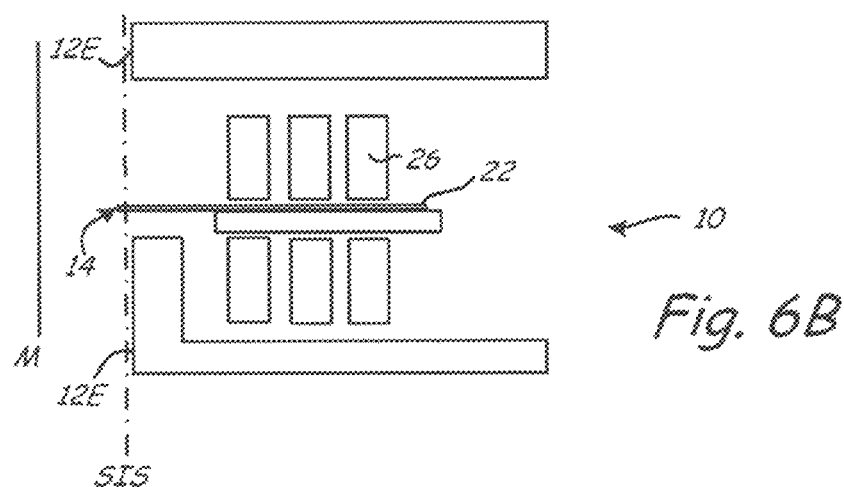
FIG. 6B is a sectional view of the write pole of the magnetic head shown in FIG. 6A after lapping and after the first controlled head-media contact.
Figure 7:
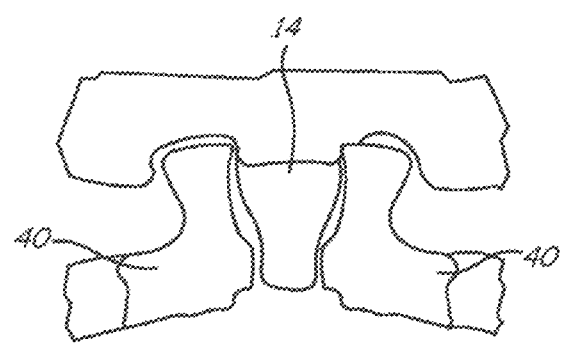
FIG. 7 is a storage interface surface view of a fifth embodiment of a contact enhancement feature surrounding the write pole shown in FIGS. 6A and 6B.

FIG. 6A shows a sectional view of magnetic head 10 after lapping but prior to exposure to any head-media contact. FIG. 6B shows a sectional view of magnetic head 10 after lapping and after exposure to a head-media contact. FIG. 7 shows a storage interface surface view of protective material 40 surrounding write pole tip 14. Protective material 40 (FIG. 7) is designed to provide a small protrusion for write pole tip 14 after the lapping process. Write pole tip 14 is initially made such that it always slightly protrudes from a plane defined by contact enhancement feature 12E. During a first controlled head-media contact (made by heating, reduced air pressure, or other means), the protruding part of write pole tip 14 is burnished off to a height substantially equal to a height of surrounding contact enhancement feature 12E (FIG. 6B). After write pole tip 14 is lapped and milled, write pole tip 14 still protrudes towards media M to a greater extent than contact enhancement feature 12E, but only slightly. Once write pole tip 14 is burnished, write pole tip 14 is no longer detrimentally pushed towards media M during thermal expansion.

While write pole tip 14 is being burnished, its protective cover is partly or fully removed, making write pole tip 14 more susceptible to corrosion. Thus, burnishing should occur immediately before or during the first electrical testing performed prior to building magnetic head 10 into a disc drive. In addition, magnetic head 10 may need further protection from corrosion until magnetic head 10 is built into the disc drive. This can be accomplished by using an easily burnishable film (not shown) to temporarily protect burnished write pole tip 14 from corrosion between the time the burnishing occurs and the time the disc drive is assembled and sealed. For example, a protective film that may be used is a Self-Assembled Monolayer (SAM) film that is readily deposited in gas form, yet can be tailored for specific chemical and mechanical properties by manipulating backbone chain lengths as well as functional end groups. Another example of a protective film is a SeaWax-type head lubricant.

Protrusion of write pole 22 relative to contact enhancement feature 12E can be achieved by putting protective material 40, which is more difficult to lap and/or mill than write pole tip 14 during planarization of magnetic head 10, proximate to write pole tip 14. However, the amount of protective material 40 is still very small so that it is burnished off to the level of contact enhancement feature 12E at the same time that write pole tip 14 is being burnished. FIG. 7 shows an exemplary embodiment of protective material 40 positioned proximately write pole tip 14. Protective material 40 may be formed of any material that is lapped or milled at a slower rate than other features of magnetic head 10 exposed at the SIS, including, but not limited to: SiC, Ta, and Cr.

The magnetic head of the present invention comprises a contact enhancement feature for increasing a head-media contact surface of a magnetic head at the storage interface surface to detect contact with magnetic media. A write pole tip of the magnetic head is typically used as the head-media contact and needs to be protected from burnishing as a result of contact with the magnetic media. The head-media contact surface created by the contact enhancement feature protects the write pole tip, as well as other components of the writer. The contact enhancement feature is positioned proximate the write pole tip and has a larger surface area than the write pole tip, helping to create a wider head-media contact surface around the write pole tip at the storage interface surface. Due to the larger surface area of the contact enhancement feature, damage to the write pole is avoided because the magnetic media will contact the contact enhancement feature before it contacts the write pole tip.

Although the present invention has been described with reference to preferred embodiments, workers skilled in the art will recognize that changes may be made in form and detail without departing from the spirit and scope of the invention.

The invention claimed is:

1. A method of manufacturing a transducer comprising:
burnishing a thermally protruded writer and a thermally protruded contact feature to a substantially planar state, wherein the burnished contact feature has a larger external surface area than the burnished writer.

2. The method of claim 1, further comprising:
burnishing a protective material located between the thermally protruded writer and the thermally protruded contact feature to the substantially planar state of the thermally protruded writer and the thermally protruded contact feature.

3. The method of claim 1, further comprising:
applying a protective film over the burnished writer that reduces corrosion of the burnished writer.

4. The method of claim 1, further comprising:
detecting contact of the burnished writer and the burnished contact feature with a moving storage medium using one or both of a position error signal detection technique and an acoustic emission detection technique.

5. The method of claim 1, wherein the substantially planar state creates a combined writer and contact feature surface area of sufficient size to indicate contact with a moving storage medium using one or both of a position error signal detection technique and an acoustic emission detection technique.

6. The method of claim 1, wherein the burnishing operation is accomplished using contact of the thermally protruded writer and the thermally protruded contact feature with a moving storage medium.

7. The method of claim 1, wherein the burnished contact feature surrounds at least a portion of the burnished writer.

8. The method of claim 1, wherein the substantially planar state of the burnished writer and the burnished contact feature is at a storage interface surface of the transducer.

9. The method of claim 1, wherein the thermally protruded writer has a coefficient of thermal expansion approximately equal to a coefficient of thermal expansion of the thermally protruded contact feature.

* * * * *